United States Patent
Nestor et al.

(10) Patent No.: US 7,748,675 B2
(45) Date of Patent: Jul. 6, 2010

(54) APPARATUS FOR INCREASING THE NUMBER OF UTILITY SLOTS IN AN AWNING TUBE UTILITY TRACK

(75) Inventors: Dennis P. Nestor, Medford, OR (US); David M. Nestor, Livingston, TX (US)

(73) Assignee: IF Designs, Medford, OR (US)

( * ) Notice: Subject to any disclaimer, the term of this patent is extended or adjusted under 35 U.S.C. 154(b) by 329 days.

(21) Appl. No.: 11/828,239

(22) Filed: Jul. 25, 2007

(65) Prior Publication Data
US 2009/0025305 A1   Jan. 29, 2009

(51) Int. Cl.
A47H 1/10 (2006.01)
A47H 1/13 (2006.01)
E06B 9/17 (2006.01)
F16B 45/00 (2006.01)
B42F 13/00 (2006.01)
F16L 3/22 (2006.01)
F16L 3/00 (2006.01)
F21V 21/00 (2006.01)
F21V 21/08 (2006.01)

(52) U.S. Cl. .................. 248/273; 248/307; 248/399; 248/340; 248/322; 248/49; 248/68.1; 362/396

(58) Field of Classification Search .......... 248/307, 248/303, 301, 339, 202.1, 340, 304, 341, 248/322, 373, 68.1, 906, 273, 310; 211/13.1, 211/60.1, 162; 160/391–397; 403/329, 397; 362/249, 252, 396

See application file for complete search history.

(56) References Cited

U.S. PATENT DOCUMENTS

| 1,248,858 | A | * | 12/1917 | Higgin | 49/438 |
| 2,189,567 | A | * | 2/1940 | Miller | 160/392 |
| 3,136,515 | A | * | 6/1964 | Potruch | 248/62 |
| 3,851,848 | A | * | 12/1974 | Wiele | 248/273 |
| 4,903,629 | A | * | 2/1990 | Maudlin et al. | 114/361 |
| 5,944,085 | A | * | 8/1999 | Malott | 160/67 |
| 5,957,186 | A | * | 9/1999 | Boswell | 160/201 |
| 6,279,641 | B1 | * | 8/2001 | Malott | 160/67 |
| 6,494,246 | B1 | * | 12/2002 | Blevins | 160/67 |
| 7,152,838 | B2 | * | 12/2006 | Taulbee | 248/307 |
| 2005/0173606 | A1 | * | 8/2005 | Taulbee, III | 248/310 |
| 2006/0232967 | A1 | * | 10/2006 | Williams | 362/249 |

OTHER PUBLICATIONS

"Awning Rails (6' Section)" Awnings Online—Largest Seller of RV Awnings in the World, http://www.rvawningsonline.com/products/details.php?r=95, printed Jun. 25, 2007, 2 pgs.

* cited by examiner

Primary Examiner—J. Allen Shriver, II
Assistant Examiner—Christopher Garft
(74) Attorney, Agent, or Firm—Blakely Sokoloff Taylor & Zafman LLP

(57) ABSTRACT

An apparatus for increasing the number of utility slots in an awning tube utility track is described. The apparatus comprises a track mount and at least two utility tracks coupled with and parallel to the track mount. In a specific example, each utility track comprises a first opening parallel to the track mount and a second opening orthogonal to the track mount.

2 Claims, 5 Drawing Sheets

APPARATUS FOR INCREASING THE NUMBER OF UTILITY SLOTS IN AN AWNING TUBE UTILITY TRACK

BACKGROUND OF THE INVENTION

1) Field of the Invention

The invention is in the field of Recreational Vehicle Accessories.

2) Description of Related Art

Accessories for recreational vehicles (RVs) are often incorporated via utility tracks in awning tubes compatible with the RVs. FIG. 1 illustrates a cross-sectional view representing an awning tube having three single-slot utility tracks, in accordance with the prior art. Referring to FIG. 1, an awning tube 100 has utility tracks 102 formed therein. The awning tube is the part of a retractable awning onto which the awning fabric is attached. Various accessories may be included for use with the RV by inserting an accessory track mount into a utility track 102. However, the utility tracks 102 of an RV awning tube 100 are single-slot utility tracks, as shown in FIG. 1. Furthermore, the utility tracks 102 are arranged in such a fashion that only one utility track may typically be accessed (i.e. the other utility tracks may be covered by awning fabric or may have an orientation incompatible with the use of more than one accessory at a time). Therefore, under typical operating conditions, only one utility track 102 within an awning tube 100 can generally be used.

Thus, an apparatus for increasing the number of utility slots in an awning tube utility track is described herein.

DETAILED DESCRIPTION

An apparatus for increasing the number of utility slots in an awning tube utility track is described. In the following description, numerous specific details are set forth, such as shapes and material compositions, in order to provide a thorough understanding of the present invention. It will be apparent to one skilled in the art that the present invention may be practiced without these specific details. In other instances, well-known manufacturing processes, such as extrusion, molding, casting and stamping techniques, are not described in detail in order to not unnecessarily obscure the present invention. Furthermore, it is to be understood that the various embodiments shown in the Figures are illustrative representations and are not necessarily drawn to scale.

Disclosed herein is an apparatus for increasing the number of utility slots in an awning tube utility track. The apparatus may comprise a track mount and at least two utility tracks coupled with and parallel to the track mount. In one embodiment, each utility track comprises a first opening parallel to the track mount and a second opening orthogonal to the track mount.

An apparatus that increases the number of utility slots in an awning tube utility track may provide more accessible locations for incorporating RV accessories. For example in accordance with an embodiment of the present invention, at least two RV accessories can be incorporated into an RV awning tube via an apparatus that increases the number of utility slots in an awning tube utility track. In a specific embodiment, the RV accessories are selected from the group consisting of a patio room, a shade, a lighting fixture and a banner.

Figure 1:
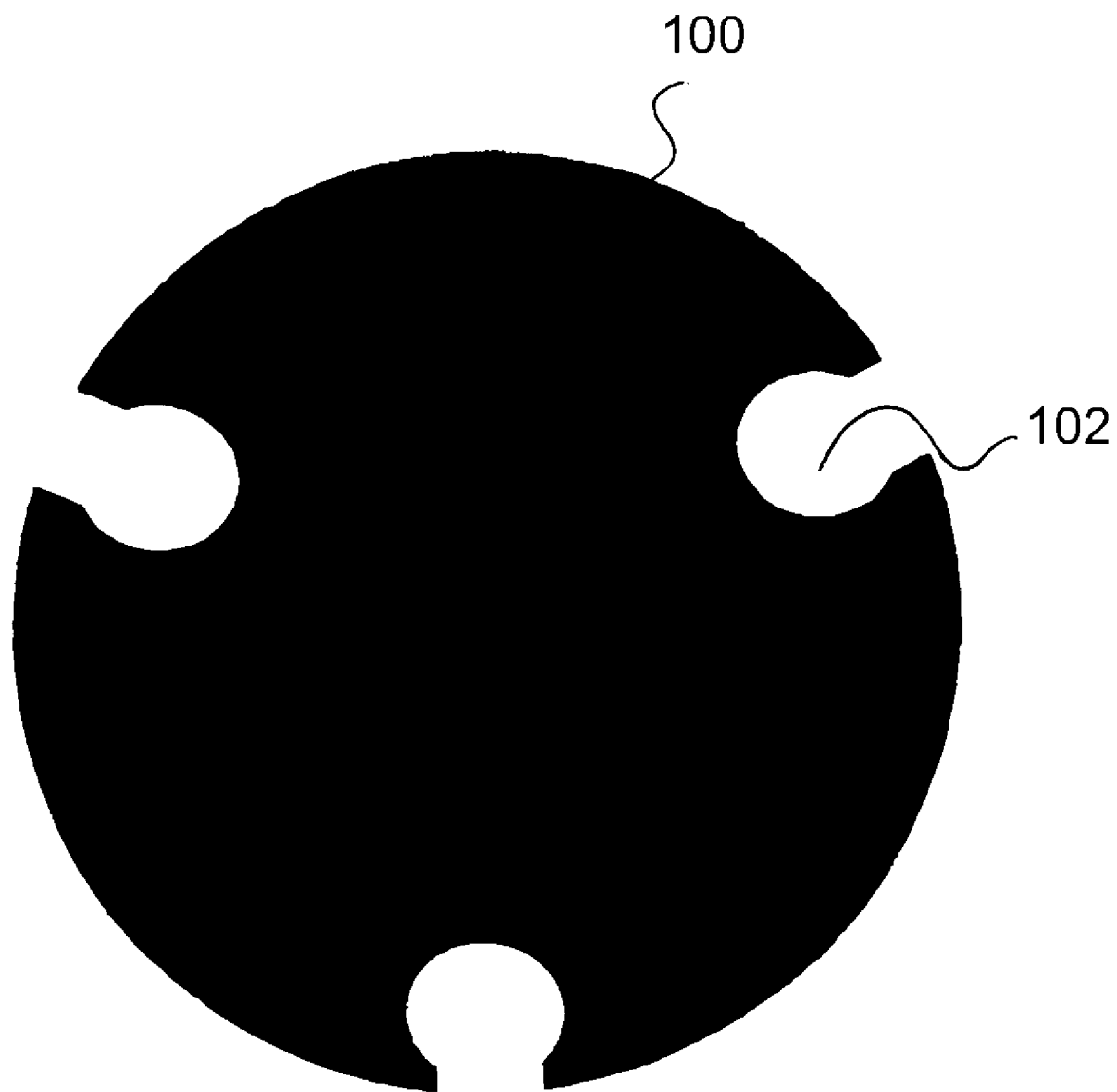
FIG. 1 illustrates a cross-sectional view representing an awning tube having three single-slot utility tracks, in accordance with the prior art.
Figure 2A:
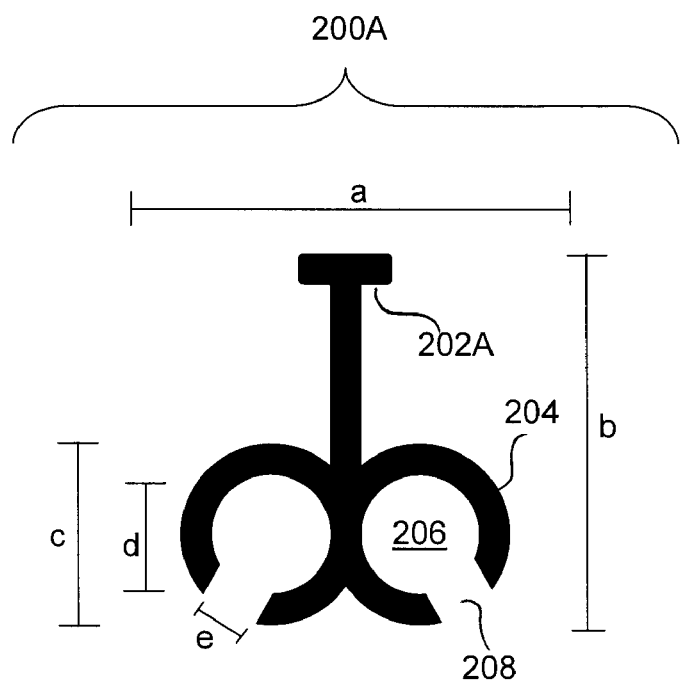
FIGS. 2A-B illustrate end-on and angled views representing apparatuses for increasing the number of utility slots in an awning tube utility track, in accordance with an embodiment of the present invention.
Figure 2B:
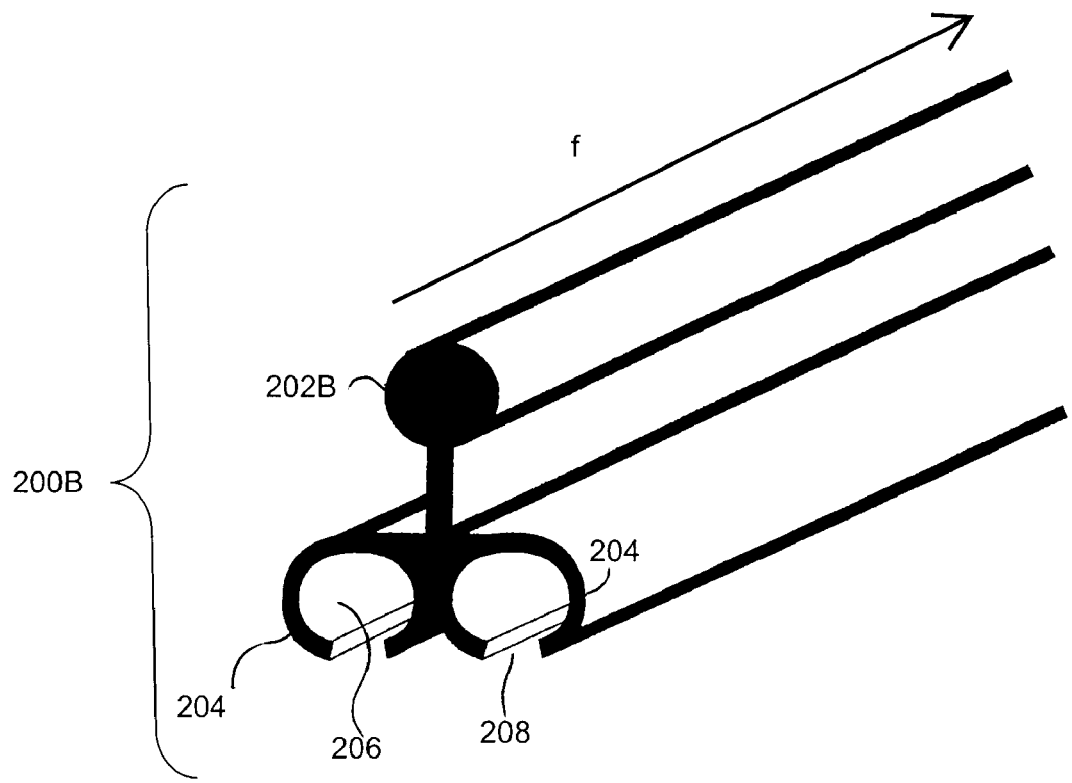

FIGS. 2A-B illustrate end-on (FIG. 2A) and angled (FIG. 2B) views representing apparatuses for increasing the number of utility slots in an awning tube utility track, in accordance with an embodiment of the present invention. Referring to FIG. 2A, an apparatus 200A for increasing the number of utility slots in an awning tube utility track is comprised of a track mount 202A and two utility tracks 204 coupled with track mount 202A. Each utility track 204 has an end opening 206 and a side opening 208.

Referring to FIG. 2B, utility tracks 204 are parallel with track mount 202B. In accordance with an embodiment of the present invention, side openings 208 are also parallel with track mount 202B. In a specific embodiment, end openings 206 are orthogonal to track mount 202B, as illustrated in FIG. 2B. However, the actual orientation of end openings 206 may vary, e.g. they may be slanted relative to track mount 202B. Thus, in accordance with an alternative embodiment of the present invention, end openings 206 are oriented approximately 45 degrees to track mount 202B.

The shape of a track mount of an apparatus for increasing the number of utility slots in an awning tube utility track may be any shape suitable for sliding into and remaining inside of an awning tube utility track. Apparatuses 200A and 200B shown in FIGS. 2A and 2B, respectively, represent two-different views of the same utility tracks, 204 having end openings 206 and side openings 208 coupled with a track mount. However, for illustrative purposes and in accordance with an embodiment of the present invention, the cross-section of track mount 202A of FIG. 2A is T-shaped, while the cross-section of track mount 202B of FIG. 2B is circular-shaped.

The dimensions of an apparatus for increasing the number of utility slots in an awning tube utility track may be any dimensions suitable for both sliding the apparatus into and remaining inside of an awning tube utility track, while providing utility slots having dimensions compatible for incorporating desired RV accessories. For example, in accordance with an embodiment of the present invention and referring to FIG. 2A, apparatus 200A has a width "a" of approximately 0.84 inches and a height "b" of approximately 0.94 inches. In a specific embodiment, utility track 204 has an outer diameter "c" of approximately 0.46 inches and an inner diameter "d" in the range of 0.28-0.30 inches and side opening 208 has a width "e" of approximately 0.15 inches. The orientation of side openings 208 may be any suitable orientation that enables the use of more than one RV accessory at a time. For example, in the case of an apparatus 200A having two utility tracks 204 (as shown in FIG. 2A), the axes of side openings 208 are directed approximately 60 degrees away from one another (where 0 degrees would encompass both side openings 208 pointing precisely downward). In one embodiment, the length "f" of apparatuses 200A and 200B is approximately 3 feet. However, in accordance with an embodiment of the present invention, several apparatuses of lesser, the same or greater length may be used together end-on-end to achieve a desired length for a particular RV accessory. In an alternative embodiment, the length of track mounts 202A and 202B is different from the length of utility tracks 204.

An apparatus for increasing the number of utility slots in an awning tube utility track may be comprised of any material suitable for providing durability while incorporating desired RV accessories. In accordance with an embodiment of the present invention, track mount 202A (or 202B) and all utility tracks 204 are comprised of substantially the same material. In one embodiment, track mount 202A (or 202B) and all utility tracks 204 are comprised of a material selected from the group consisting of rigid polyvinyl chloride, acrylonitrile butadiene styrene plastic, fiberglass and a metallic species. In a specific embodiment, track mount 202A (or 202B) and all utility tracks 204 are comprised of a metallic species selected from the group consisting of aluminum and steel.

Figure 3A:
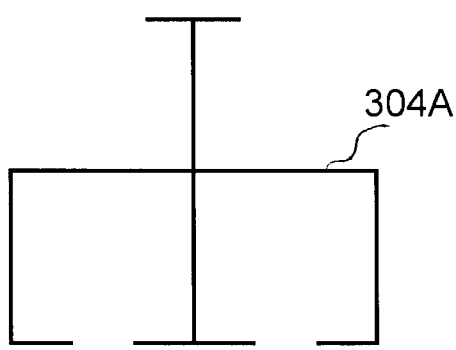
FIGS. 3A-B illustrate end-on views representing apparatuses for increasing the number of utility slots in an awning tube utility track, in accordance with an embodiment of the present invention.
Figure 3B:
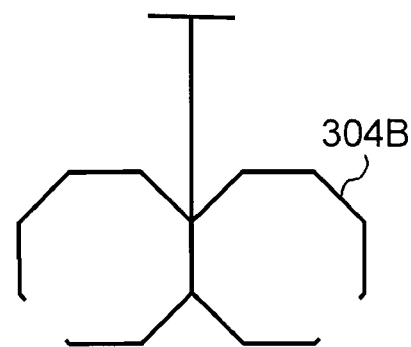

The cross-sectional shape of each utility track 204 in an apparatus for increasing the number of utility slots in an awning tube utility track is not limited to circular-shaped, as is illustrated in FIGS. 2A and 2B. For example, FIGS. 3A-B illustrate end-on views representing apparatuses for increasing the number of utility slots in an awning tube utility track, in accordance with an alternative embodiment of the present invention. In one alternative embodiment, referring to FIG. 3A, the cross-sectional shape of each utility track 304A is square-shaped. In another alternative embodiment, referring to FIG. 3B, the cross-sectional shape of each utility track 304B is octagonal-shaped.

Figure 4:
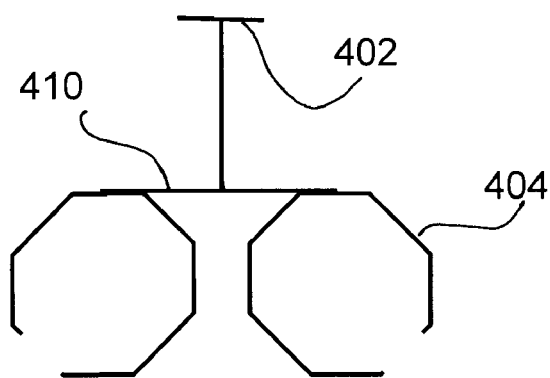
FIG. 4 illustrates an end-on view representing an apparatus for increasing the number of utility slots in an awning tube utility track, in accordance with an embodiment of the present invention.

The relative arrangement of each utility track in an apparatus for increasing the number of utility slots in an awning tube utility track is not limited to being directly adjacent (abutted) to one another, as is illustrated in FIGS. 2A, 2B, 3A and 3B. For example, FIG. 4 illustrates an end-on view representing an apparatus for increasing the number of utility slots in an awning tube utility track, in accordance with an alternative embodiment of the present invention. Referring to FIG. 4, an adjoining bar 410 couples utility tracks 404 with track mount 402, while utility tracks 404 are separated from one another.

Figure 5A:
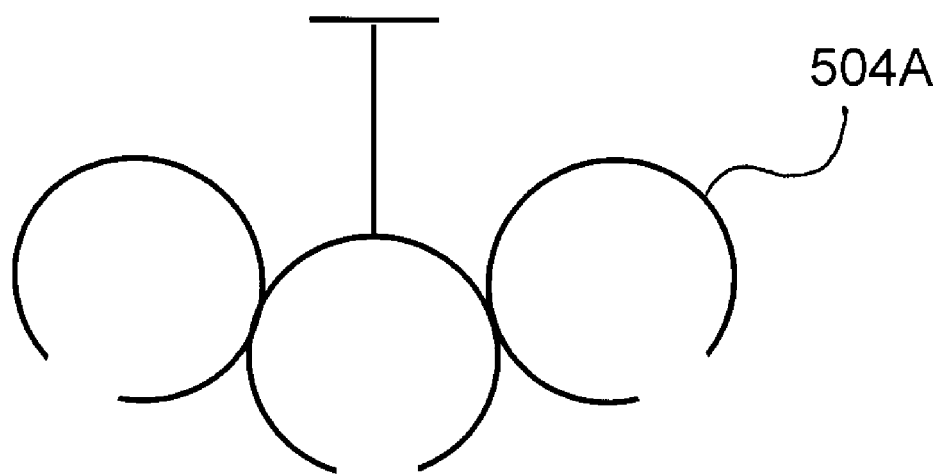
FIGS. 5A-B illustrate end-on views representing apparatuses for increasing the number of utility slots in an awning tube utility track, in accordance with an embodiment of the present invention.
Figure 5B:
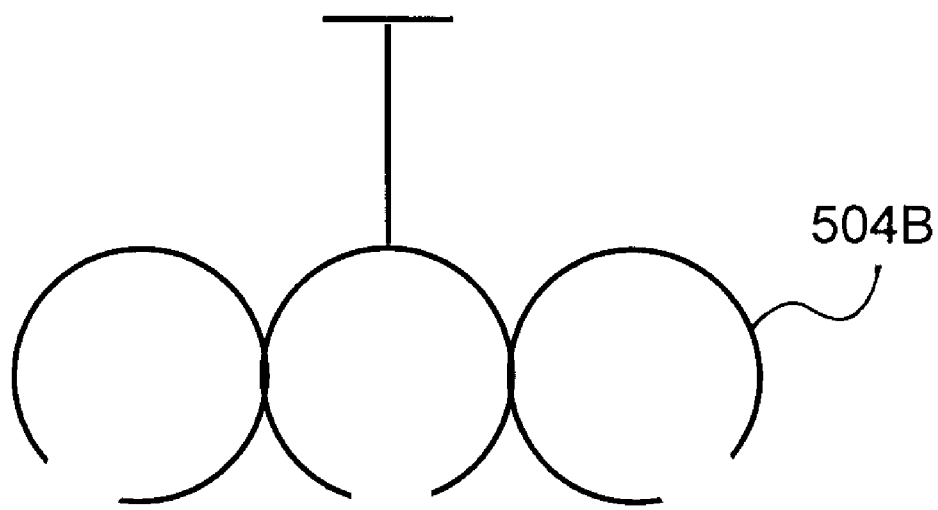

The number of utility tracks in an apparatus for increasing the number of utility slots in an awning tube utility track is not limited to two, as is illustrated in FIGS. 2-4. For example, FIGS. 5A-B illustrate end-on views representing apparatuses for increasing the number of utility slots in an awning tube utility track, in accordance with an alternative embodiment of the present invention. In one alternative embodiment, referring to FIG. 5A, the number of utility tracks 504A is three and the cross-sectional centers of all utility tracks 504A are non-planar. In another alternative embodiment, referring to FIG. 5B, the number of utility tracks 504B is three and the cross-sectional centers of all utility tracks 504B are co-planar.

Figure 6:
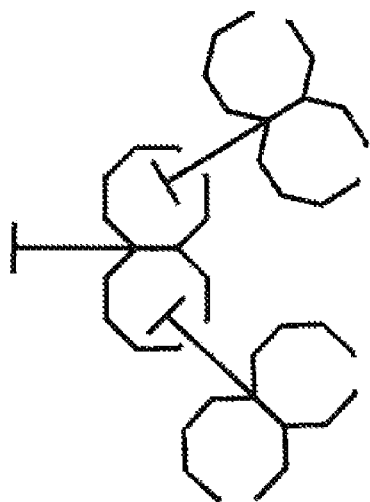
FIG. 6 illustrates end-on views representing apparatuses for increasing the number of utility slots in an awning tube utility track, in accordance with an embodiment of the present invention.
Figure 6:
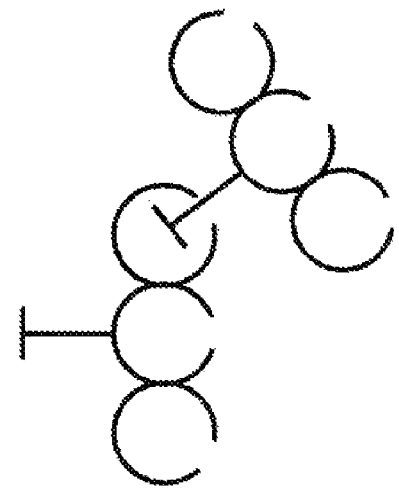
Figure 6:
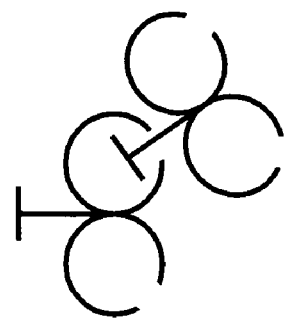
Figure 6:
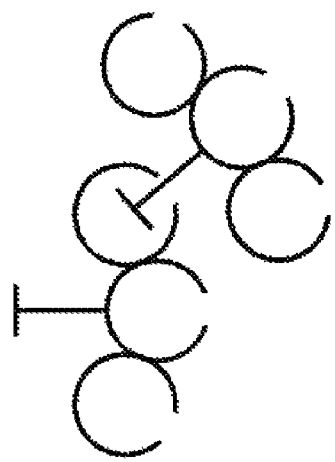

The number of apparatuses for increasing the number of utility slots in an awning tube utility track is not limited to one. For example, FIG. 6 illustrates end-on views representing apparatuses for increasing the number of utility slots in an awning tube utility track, in accordance with an alternative embodiment of the present invention. Referring to the examples provided in FIG. 6, the present invention encompasses all permutations and combinations of using multiple apparatuses for increasing the number of utility slots in a single awning tube utility track.

Thus, an apparatus for increasing the number of utility slots in an awning tube utility track has been disclosed. In one embodiment, the apparatus comprises a track mount and at least two utility tracks coupled with and parallel to the track mount. In a specific embodiment, each utility track comprises a first opening parallel to the track mount and a second opening orthogonal to the track mount.

What is claimed is:

1. An apparatus for increasing the number of utility slots in an awning tube utility track, the apparatus comprising:
    a track mount; and
    two utility tracks coupled with and parallel to said track mount, wherein each of the two utility tracks comprises a first opening parallel to said track mount and a second opening orthogonal to said track mount, wherein the width of said apparatus is approximately 0.84 inches, wherein the height of said apparatus is approximately 0.94 inches, wherein each of the two utility tracks has an outer diameter of approximately 0.46 inches and an inner diameter in the range of 0.28-0.30 inches, wherein said first opening has a width of approximately 0.15 inches, and wherein said track mount has a length of approximately 3 feet.

2. A method of increasing the number of utility slots in an awning tube utility track, the method comprising:
    providing an apparatus comprising a track mount and two utility tracks coupled with and parallel to said track mount; and
    inserting the apparatus into an awning tube utility track, wherein the width of said apparatus is approximately 0.84 inches, wherein the height of said apparatus is approximately 0.94 inches, wherein each of the two utility tracks has an outer diameter of approximately 0.46 inches and an inner diameter in the range of 0.28-0.30 inches, wherein said first opening has a width of approximately 0.15 inches, and wherein said track mount has a length of approximately 3 feet.

* * * * *